J. S. WENTWORTH.
MACHINE FOR SOIL TILLAGE.
APPLICATION FILED MAY 21, 1917.
1,319,936.
Patented Oct. 28, 1919.
3 SHEETS—SHEET 1.
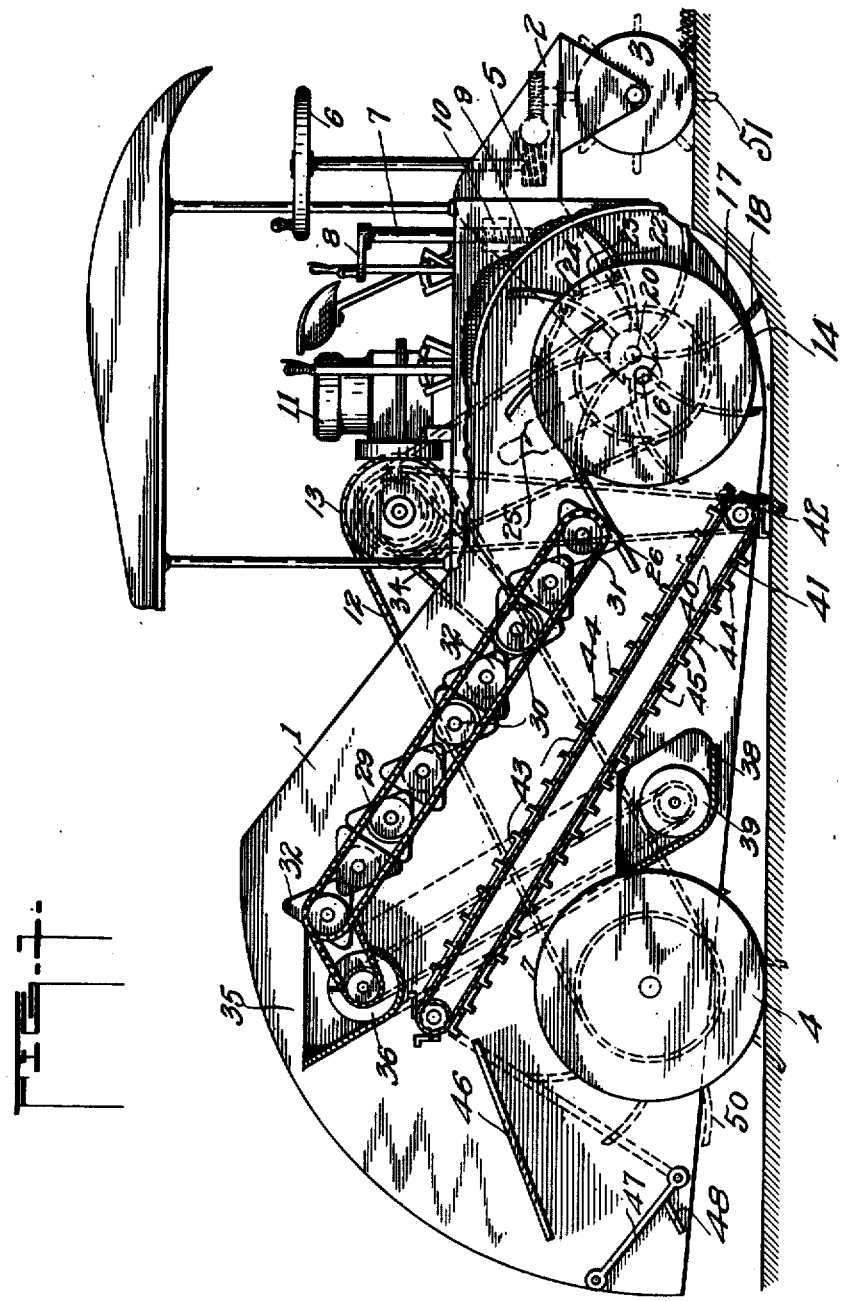
INVENTOR
Jesse S. Wentworth
Pate & Bean
ATT'YS

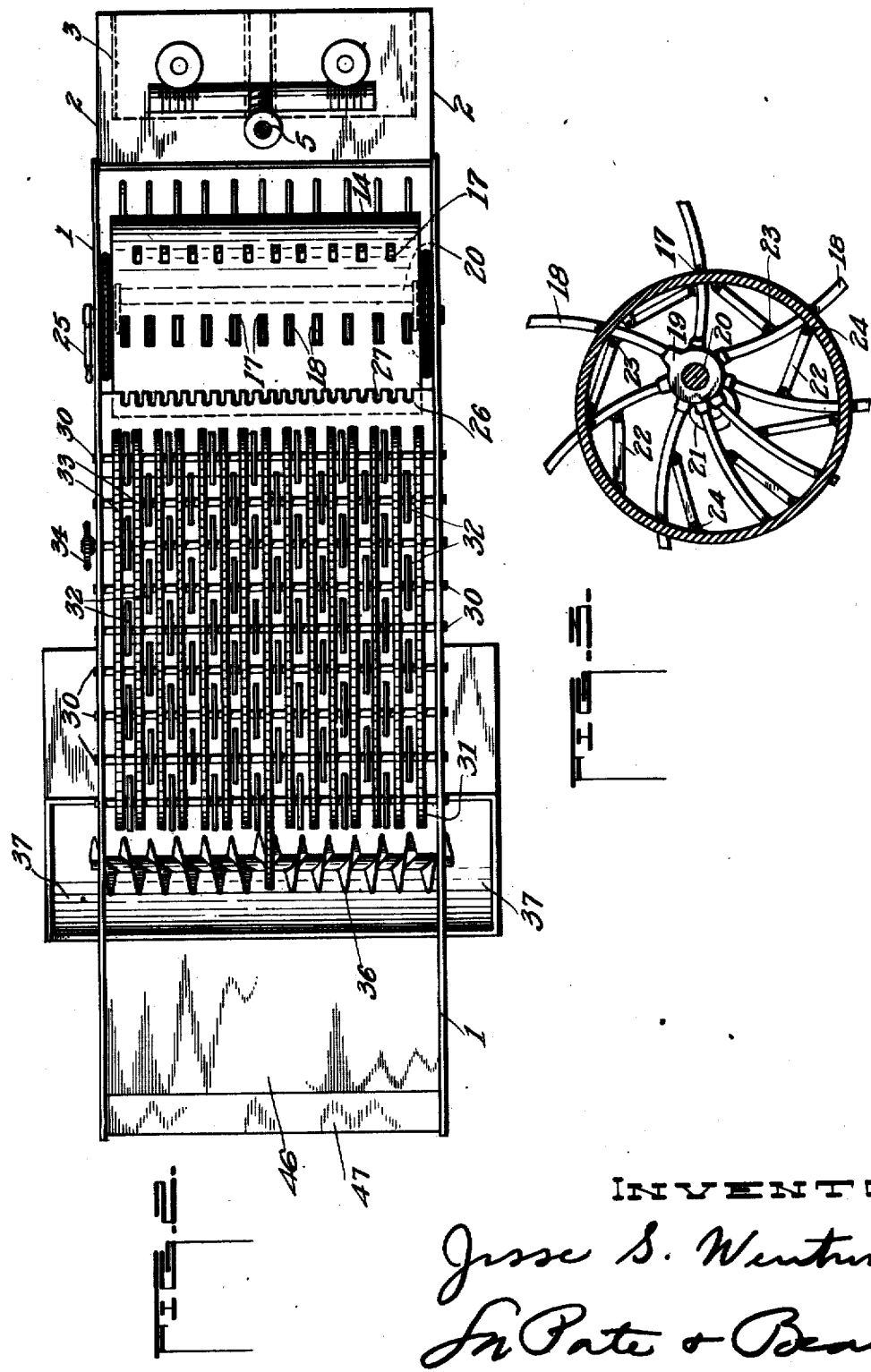

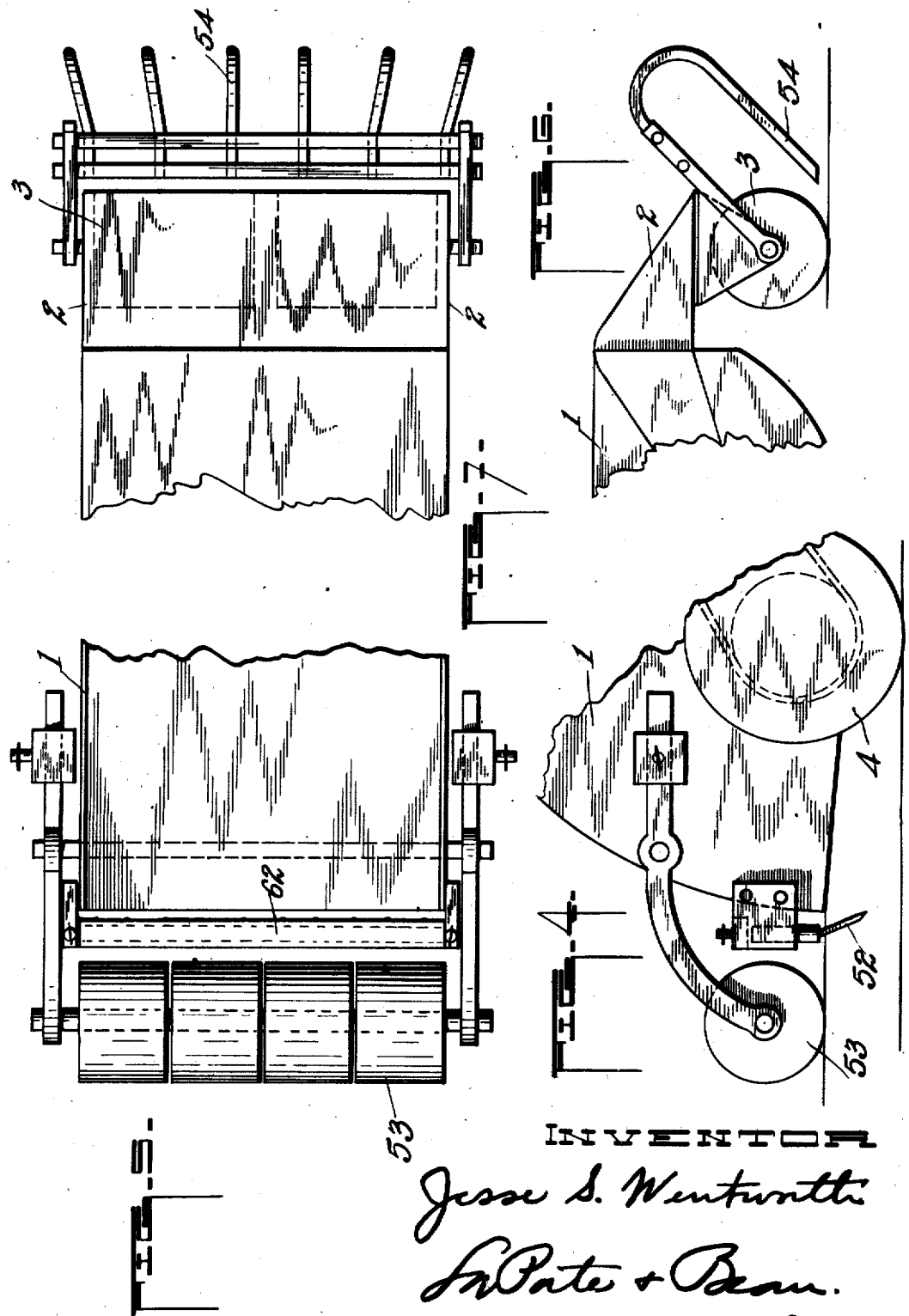

UNITED STATES PATENT OFFICE.

JESSE S. WENTWORTH, OF CINCINNATI, OHIO.

MACHINE FOR SOIL-TILLAGE.

1,319,936.   Specification of Letters Patent.   Patented Oct. 28, 1919.

Application filed May 21, 1917. Serial No. 169,853.

*To all whom it may concern:*

Be it known that I, JESSE S. WENTWORTH, a citizen of the United States, a resident of Cincinnati, in the county of Hamilton and State of Ohio, have invented new and useful Improvements in Machines for Soil-Tillage, of which the following is a specification.

My invention relates to improvements in machines for soil tillage.

The principal object of this invention is the provision of a machine which will completely till the soil and place it in condition for planting.

Another object of this invention is the provision of a machine which will remove a layer of soil, vegetation and other material from the ground, disintegrate this material and separate the finer particles therefrom, deposit the larger particles, vegetation and other material in the trench or ditch formed by the removal of said material and then deposit the finer particles on top to form a loose mulch.

Various other objects and purposes of this invention will be apparent from a consideration of the following specification.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which shows merely for the purpose of illustrative disclosures, a preferred embodiment of my invention, it being understood that various changes may be made in practice within the scope of the claims without digressing from my inventive idea.

In the drawings,

Figure 1 represents a vertical longitudinal section through a machine constructed to embody my invention;

Fig. 2 is a top plan view of the machine shown in Fig. 1, the fore-part of the machine including the motor being removed to disclose the construction of the digging cylinder and coöperating parts;

Fig. 3 is a section through the digging cylinder;

Fig. 4 represents a side elevation of the rear portion of the machine with an auxiliary roller and raking device mounted thereon;

Fig. 5 represents a top plan view of the parts shown in Fig. 4;

Fig. 6 represents a side elevation of the forward portion of the machine with the raking device or attachment mounted in front thereof;

Fig. 7 represents a top plan view of the parts shown in Fig. 6.

Referring now to the drawings, wherein I show a preferred form of mechanism, the numeral 1 designates the main frame of the machine which is formed so as to support and house the various parts. To the front portion of this main frame is pivotally connected the front or auxiliary frame 2, which is supported by the front guiding rollers 3, the main frame being supported and driven by the traction roller 4. I provide the worm gear arrangement 5 operated by the handle member 6 for controlling the rollers 3 so as to steer the machine as desired. I also provide the shaft 7 operated by handle 8 having the screw threads 9 working in the stationary nut 10 for the purpose of adjusting the angular relation between the main frame and the front or auxiliary frame, this being for the purpose of regulating the depth to which the digging and cutting cylinder operates in the top portion of the soil.

I also provide on the main frame a suitable motor 11 from which the various parts are driven. The traction roller 4 is driven by operative connection 12 from the gears 13 which are controlled suitably so as to vary the speed and direction of movement of the machine as is well understood. Any suitable means for this purpose may be used.

In the front portion of the machine, I provide the cylinder or roller 14 which is driven by means of operating connection 15 from the motor in a direction opposite to the direction of movement of the mechanism as a whole. This cylinder is mounted on the stationary stud shafts 16 and has its outer surface provided with the plurality of apertures or slots 17 through which are projected suitable tines or digging and cutting members 18, preferably of the form substantially as shown in the drawings. These digging and cutting members 18 are provided with the apertured ear portions 19 which are secured to the stationary shaft 20, this shaft being connected to the stud shafts 16 by means of members 21. These cutting and digging members are pivotally mounted within the cylinder by means of links 22 which are pivoted to the members 18 at 23 and to the inside of a cylinder as at 24. It is seen that the shaft 20 to which these digging and cutting members are loosely connected has an eccentric relation with the stud shafts 16 and consequently with the cylinder as a whole, and this eccentric relation may be varied by means of an adjustment lever 25 connected to the stud shafts 16. Therefore, due to this eccentric positioning of shaft 20 and links 23, when the cylinder is rotated, the digging and cutting members 18 will be forced outwardly beyond said apertures 17 in the cylinder and then withdrawn, this reciprocation taking place during one rotation of the cylinder. Obviously, the projection of these digging and cutting members takes place along or adjacent to the bottom line of the trench, so that all the soil and vegetation thereabove will be dug and lifted by means of said members over the top of the cylinder and deposited on a combined sieve and conveyer which will presently be described. Of course it is understood that the frame and housing is so shaped about these members as to permit their proper operation and also to assist in the retention of the soil and vegetation or other material on the cylinder and cutting and digging members until it is discharged onto the sieve and conveyer member or removed by means of the apron 26. This apron has slots 27 in its upper edge to permit the passage of the digging and cutting members 18 and also similar slots in its lower edge to permit its proper coöperation with the sieve and conveyer member. It is also to be understood that the retraction of the digging and cutting members within the cylinder acts to automatically strip any soil or other material which may adhere thereto so that the cylinder is cleaned automatically and all of the material discharged onto the sieve and conveyer member.

This sieve and conveyer member is designated generally by the reference character 29 and, as shown, is located to the rear of the cylinder 14, extending rearwardly and upwardly to certain discharge chutes and conveyers which will be described hereinafter. This combined sieve and conveyer comprises the plurality of transversely extending shafts 30 on which shafts are mounted, preferably in alternation, sprocket wheels 31 and disk members 32, the sprocket wheels and disk members on alternate shafts being arranged in staggered relation. Suitable chains 33 are connected to said sprocket members, these parts all being driven from the motor by means of a chain and sprocket connection 34. As shown, the disks are preferably triangular in shape, having their ends slightly curved or rounded. The function of this part of the mechanism is to separate the larger particles of vegetation and soil from the smaller particles, as well as to disintegrate the particles of material to some extent, due to the pounding action of the disks and chains. The smaller particles pass through this member while the larger particles including the vegetation, are conveyed upwardly to the discharge chutes and conveyers.

These include the horizontally extending troughs 35 having the screw conveyers 36 therein. These troughs extend to the edge of the machine and communicate with the downwardly extending chutes 37, which in turn communicate with the horizontally extending troughs 38 in which is positioned another screw conveyer 39. These last mentioned troughs have a discharge opening positioned immediately in front of the roller 4 so that the larger particles of soil, vegetation and other material which do not pass through the sieve member 29 are placed at the bottom of the ditch or trench formed by the cylinder 14 and are compressed by the action of the roller 4.

In connection with these elements of my construction I also provide an auxiliary digging and conveying member 40 which is positioned to the rear of the cylinder 14 and beneath the combined sieve and conveyer member 29, being somewhat larger than said member, and serving to remove a portion of the soil in the bottom of the ditch or trench made by the digging and cutting cylinder 14 and to convey said soil together with the soil and other material which has passed through the sieve and conveyer member 29, up to a suitable screening mechanism for further separating. This digging and conveying mechanism includes the endless chains or belts 41 driven by means of sprockets 42 and having mounted thereon, the series of digging and conveying buckets or receptacles 43, these being merely members with flat bottoms and having the outwardly extending end flange 44 for the purpose of digging and retaining material discharged thereon. These buckets or receptacles are pivotally connected to said endless chain 41 at a point about two-fifths of the distance from their unflanged ends, as at 45, so that as they pass around the lower sprocket they will be thrown outwardly to dig into and remove a portion of the soil in the bottom of the previously formed ditch or trench, and will lift and convey said soil upwardly together with the material which has passed through the sieve as above described, until it reaches the upper turn, when, due to the pivotal connection with the chains, said buckets or receptacles will be thrown outwardly discharging the material therein onto the chute 46 from whence it passes by gravity to the vibrating screen 47. This screen is driven by any suitable means and serves to separate the finer particles of soil and other material. The larger particles are passed off the screen and deposited in a ditch or trench in the rear of the roller 4, the finer particles being deposited on top thereof, the guard 48 insuring the proper discharge of this material.

It is to be understood that while I have shown only one vibrating screen, that a number may be used if desired, the purpose being to deposit the soil and other material in varying degrees of fineness into the trench which has been made by the cutting and digging cylinder and the digging conveyer, so that the top portion of the treated soil is in proper condition for immediate planting after it has been subjected to the action of this machine.

Attention is directed to the fact that I also contemplate the use of digging and cutting members 50 similar to those shown in cylinder 14, in connection with the roller 4, as indicated in dotted lines, this being for the purpose of intermixing and tamping the vegetation and other material, and also to give proper traction to the roller 4 in driving the machine. These members 50 are operated in substantially the same way as members 18. This same provision may be made in connection with rollers 3 as indicated in dotted lines at 51.

After the fine particles of material have been deposited, I may rake and compress the soil, as shown in Figs. 4 and 5 of the drawing, wherein 52 designates the rake and 53 the roller mounted to travel in the rear thereof.

As it may be advisable under certain conditions to rake the vegetation and other material into proper position for effective operation of the cutting and digging members, I may use a raking device in front of the machine, as shown in Figs. 6 and 7 of the drawing, wherein 54 designates the rake.

It will be understood that the gear constructions on the main driving shaft are such as to permit the proper operation of the various parts of this device in the direction specified.

What I claim is:—

1. A mechanism of the character described, including in combination, means for removing a layer of soil, vegetation or other material, means for disintegrating the same, means for depositing the larger particles of the soil, vegetation and other material in the bottom of the trench or ditch formed by the removal of said layer, means for compressing the larger particles of soil, vegetation and other material after being deposited in said ditch or trench and means for separating the finer particles of the material into different grades and depositing said grades in said ditch or trench with the finest grade of material on top.

2. A mechanism of the character described, including in combination, means for removing a layer of soil, vegetation or other material, means for disintegrating and separating the same, means for removing a portion of the soil from the bottom of said ditch or trench, means for depositing the larger particles of the soil, vegetation and other material in the bottom of the trench or ditch formed by the removal of said layer, means for separating the finer particles and said last mentioned soil into grades of varying fineness and depositing the said soil and material in said ditch or trench with the finest grade of material on top in the form of a loose mulch.

3. A mechanism of the character described including in combination, a portable supporting means, a rotatable cylinder mounted therein and having a plurality of projectable and retractable cutting and digging members adapted to remove a layer of soil, vegetation and other material, means for rotating said cylinder and projecting and retracting said cutting and digging members, a combined sieve and conveyer member so positioned as to receive the material from said cutting and digging cylinder and adapted to disintegrate said material and to separate the finer particles therefrom, a conveying means to which the larger particles of soil, vegetation and other material are delivered from said combined sieve and conveyer member and deposited in the bottom of the trench formed by the action of said cutting and digging cylinder, means for separating the finer particles into grades of different fineness and depositing the same in said ditch or trench on top of the larger particles previously deposited.

4. A mechanism of the character described including in combination, a portable supporting means, a rotatable cylinder mounted therein and having a plurality of projectable and retractable cutting and digging members adapted to remove a layer of soil, vegetation and other material, means for rotating said cylinder and projecting and retracting said cutting and digging members, a combined sieve and conveyer member positioned so as to receive the material from said cutting and digging cylinder and adapted to disintegrate said material and to separate the finer particles therefrom, a conveying means to which the larger particles of soil, vegetation and other material are delivered from said combined sieve and conveyer member and deposited in the bottom of the trench formed by the action of said cutting and digging cylinder, an auxiliary digging means adapted to remove a portion of the soil from the bottom of the ditch or trench before said larger particles are redeposited therein, said auxiliary digging means being also adapted to receive the finer particles from said sieve and conveyer member, separating means adapted to receive said finer particles and said last mentioned soil and divide it into grades of different fineness, and means for depositing the same in said ditch or trench on top of the finer particles with the finest grade of material on top.

5. A mechanism of the character described including in combination, a portable supporting means, a rotatable cylinder mounted therein and having a plurality of projectable and retractable cutting and digging members adapted to remove a layer of soil, vegetation and other material, means for rotating said cylinder and projecting and retracting said cutting and digging members, a combined sieve and conveyer member so positioned as to receive the material from said cutting and digging cylinder and adapted to disintegrate said material and to separate the finer particles therefrom, a conveying means to which the larger particles of soil, vegetation and other material are delivered from said combined sieve and conveyer member and deposited in the bottom of the trench formed by the action of said cutting and digging cylinder, means for separating the finer particles into grades of different fineness and depositing the same in said ditch or trench on top of the larger particles previously deposited, said combined sieve and conveyer member including a plurality of transversely extending shafts having sprocket wheels and disintegrating disks mounted thereon in alternation and chains meshing with said sprocket wheels.

6. A mechanism of the character described, including a combination, a portable supporting means, a rotatable cylinder mounted therein and having a plurality of projecting and retracting cutting and digging members adapted to remove a layer of soil, vegetation and other material, means for rotating said cylinder and projecting and retracting said cutting and digging members, a combined sieve and conveyer member positioned so as to receive the material from the cutting and digging cylinder and adapted to disintegrate said material and to separate the finer particles therefrom, a conveying means to which the larger particles of soil, vegetation and other material are delivered from said combined sieve and conveyer member and deposited in the bottom of the trench formed by the action of said cutting and digging cylinder, an auxiliary digging means adapted to remove a portion of the soil from the bottom of the ditch or trench before said larger particles are redeposited therein, said auxiliary digging means being also adapted to receive the finer particles from said sieve and conveyer member, separating means adapted to receive said finer particles and said last mentioned soil and divide it into grades of different fineness and means for depositing the same in said ditch or trench on top of the finer particles with the finest grade of material on top, said auxiliary digging member being in the form of an endless conveyer including endless chains, having digging members extending transversely thereof provided with outwardly extending edge flanges, said members being pivotally connected to said chains by pivots so that they will engage the soil and also discharge the soil therefrom.

7. A mechanism of the character described, including in combination, a portable support, a rotatable digging and cutting member mounted therein having projectable and retractable digging and cutting means adapted to remove a layer of soil, vegetation or other material, an auxiliary digging member located to the rear of said rotatable digging and cutting member and adapted to remove a portion of the soil from the bottom of the ditch or trench formed by said first mentioned digging and cutting member, a combined sieve and conveyer member located above said auxiliary cutting member and adapted to receive the material from said first mentioned digging and cutting member, and to disintegrate and separate the same, conveying the larger particles of soil, vegetation or other material, and permitting the finer particles to pass on through said auxiliary digging and cutting member, conveying means adapted to receive material from the upper end of said combined sieve and conveyer and to discharge the same in the bottom of said ditch and trench, a roller mounted so as to compress said redeposited material, separating mechanism adapted to receive the material from said auxiliary cutting and digging member and discharge the same into said ditch or trench on top of the larger particles previously deposited and compressed.

8. A mechanism of the character described including in combination, a portable support, a rotatable digging and cutting member mounted therein having projectable and retractable digging and cutting means adapted to remove a layer of soil, vegetation or other material, an auxiliary digging member located to the rear of said rotatable digging and cutting member and adapted to remove a portion of the soil from the bottom of the ditch or trench formed by said first mentioned digging and cutting member, a combined sieve and conveyer member located above said auxiliary cutting member and adapted to receive the material from said first mentioned digging and cutting member, and to disintegrate and separate the same, conveying the larger particles of soil, vegetation or other material, and permitting the finer particles to pass on to the said auxiliary digging and cutting member, conveying means adapted to receive material from the upper end of said combined sieve and conveyer and to discharge the same in the bottom of said ditch or trench, a roller mounted so as to compress said redeposited material, separating mechanism adapted to receive the material from said auxiliary cutting and digging member and discharge the same into said ditch or trench on top of the larger particles previously deposited and compressed and means for adjusting the depth to which said cutting and digging members operate.

9. A mechanism of the character described including in combination, a portable supporting frame having a traction and compression roller in the rear, guiding rollers in the front and a digging and cutting cylinder in the forward portion thereof, said digging and cutting cylinder having means adapted to remove the top portion of the soil, a combined sieve and conveyer member adapted to receive the material from said digging and cutting cylinder, said combined sieve and conveyer member including a plurality of transversely extending shafts having disks and sprockets arranged thereon in alternation, and chains running over said sprockets, means to drive one of said transversely extending shafts, the finer particles of the material passing through said combined sieve and conveyer member and the larger particles being deposited in front of said traction and compression roller, separating means for separation of the finer particles and means for conveying said finer particles to said separating means.

10. A mechanism of the character described including in combination, a portable supporting means, having a traction and compression roller mounted at the rear, guiding rollers at the front and a digging and cutting cylinder having means adapted to remove a portion of the soil, a combined sieve and conveyer member adapted to receive the material from said digging and cutting cylinder and to separate the finer particles therefrom, discharging mechanism associated with said combined sieve and conveyer member to receive the larger particles of soil, vegetation and other material and depositing the same into the ditch or trench formed by the removal of said layer of material in front of the compression and traction roller, an auxiliary digging means located beneath said combined sieve and conveyer and adapted to remove a portion of the soil from the bottom of said ditch or trench after the operation of the cutting and digging cylinder and also to receive the finer particles passed through said combined sieve and conveyer member and to convey said material upwardly, said auxiliary digging means including endless chains and digging members pivotally connected to said chains at points nearer one edge than the other and having an outwardly extending flange, sprockets for driving said chains, said digging members being adapted to be thrown out of said pivotal connection to dig a portion of the soil at their lower ends and to discharge the material conveyed therein at their upper ends, and separating mechanism for receiving the material from said auxiliary digging means.

JESSE S. WENTWORTH.